United States Patent
Okamura et al.

(10) Patent No.: US 10,644,332 B2
(45) Date of Patent: May 5, 2020

(54) GAS-LIQUID SEPARATOR

(71) Applicant: HONDA MOTOR CO., LTD., Minato-ku, Tokyo (JP)

(72) Inventors: Yuji Okamura, Wako (JP); Tetsuya Fukuda, Wako (JP); Yoichiro Saito, Mito (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/012,842

(22) Filed: Jun. 20, 2018

(65) Prior Publication Data
US 2018/0375122 A1    Dec. 27, 2018

(30) Foreign Application Priority Data
Jun. 22, 2017  (JP) .................................. 2017-122258

(51) Int. Cl.
*B01D 45/08*     (2006.01)
*H01M 8/04*      (2016.01)
*H01M 8/04119*   (2016.01)

(52) U.S. Cl.
CPC ........ *H01M 8/04164* (2013.01); *B01D 45/08* (2013.01); *H01M 2250/20* (2013.01)

(58) Field of Classification Search
CPC ........................... B01D 45/08; H01M 8/04164
See application file for complete search history.

(56) References Cited

U.S. PATENT DOCUMENTS

2003/0190509 A1* 10/2003 Byron, Jr. .............. B01D 45/08
                                                    429/129

FOREIGN PATENT DOCUMENTS

JP          07-259549       10/1995

* cited by examiner

*Primary Examiner* — Miriam Stagg
*Assistant Examiner* — Rachel L Zhang
(74) *Attorney, Agent, or Firm* — Amin, Turocy & Watson, LLP

(57) ABSTRACT

A gas-liquid separator includes a casing in which there are formed an inlet port to which a gas-liquid two-phase flow is supplied, and an outlet port through which a gas flow is discharged after the gas-liquid two-phase flow has been separated into a gas and a liquid. A gas-liquid separation chamber is formed in the casing by a partition wall. The inlet port opens on a surface of the partition wall in the gas-liquid separation chamber. The gas-liquid separator further includes a deflection member configured to change a flow direction of the gas-liquid two-phase flow that flows in from the inlet port, and a clearance is formed between the deflection member and an inner wall of the casing.

5 Claims, 5 Drawing Sheets

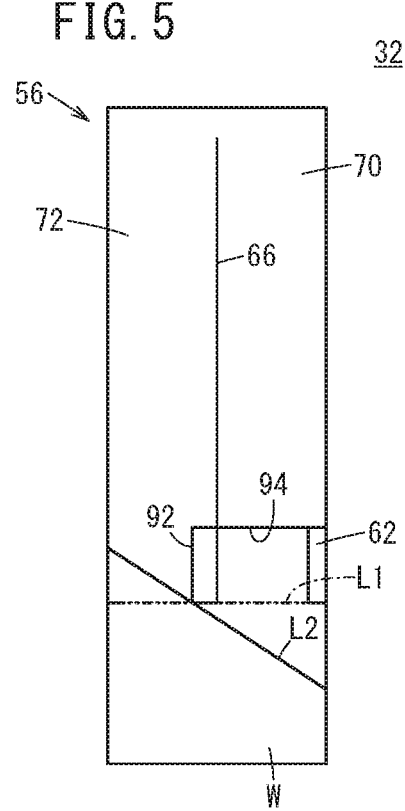

GAS-LIQUID SEPARATOR

CROSS-REFERENCE TO RELATED APPLICATION

This application is based upon and claims the benefit of priority from Japanese Patent Application No. 2017-122258 filed on Jun. 22, 2017, the contents of which are incorporated herein by reference.

BACKGROUND OF THE INVENTION

Field of the Invention

The present invention relates to a gas-liquid separator, and more particularly, to a gas-liquid separator suitable for attachment to a fuel cell.

Description of the Related Art

As is well known, a fuel cell includes an anode and a cathode which face toward one another with an electrolyte (for example, a solid polymer membrane) being sandwiched therebetween. A fuel gas such as hydrogen is supplied to the anode, and an oxygen containing gas such as compressed air is supplied to the cathode to thereby generate electricity. At least a part of the fuel gas and the oxygen containing gas are consumed. However, unreacted components thereof are discharged as fuel exhaust gas and oxygen containing exhaust gas from the anode and the cathode to a fuel exhaust gas discharge flow passage and an oxygen containing exhaust gas discharge flow passage, respectively. In this manner, the fuel cell system is constituted by adding reaction gas supply equipment and discharge equipment, etc., with respect to the fuel cell.

The fuel exhaust gas is a gas-liquid two-phase flow containing water. Thus, a gas-liquid separator for separating the fuel exhaust gas into hydrogen and water is provided in the fuel exhaust gas discharge flow passage. Hydrogen from which the water is separated is resupplied to the anode. On the other hand, the water is discharged via a drain valve from the gas-liquid separator.

As a gas-liquid separator which performs such a function, the gas-liquid separator described in Japanese Laid-Open Patent Publication No. 07-259549 is known. Moreover, with the gas-liquid separator, drained water is separated from the engine exhaust gas. In general, the separated drained water is discharged from a drain port and a drain valve provided at the bottom of the gas-liquid separator and which make up a liquid discharging unit.

SUMMARY OF THE INVENTION

In particular, in a vehicle-mounted fuel cell system, a reduction in size thereof is required. Therefore, it is also required to reduce the size of the gas-liquid separator that makes up part of the fuel cell system.

When attempting to reduce the size of the gas-liquid separator in which the inlet port is disposed at the bottom of the casing, the inlet port and the drain port are placed in close proximity to each other. In this case, in the vehicle-mounted fuel cell system, at a time that the vehicle body becomes inclined accompanying the user performing a steering operation together with the gas-liquid separator being placed in an inclined posture, there is a concern that the liquid surface level of the drain water in the gas-liquid separator may become higher than the inlet port. Stated otherwise, the inlet port becomes closed by the drain water. When such a state occurs, it becomes difficult for the fuel exhaust gas to flow into the gas-liquid separator from the inlet port.

A principal object of the present invention is to provide a gas-liquid separator in which inward flowing of a gas-liquid two-phase flow from an inlet port occurs easily, even in the case that the gas-liquid separator is in an inclined posture.

According to an embodiment of the present invention, a gas-liquid separator is provided, including a casing in which there are formed an inlet port to which a gas-liquid two-phase flow is supplied, a gas-liquid separation chamber configured to separate the gas-liquid two-phase flow, which is introduced from the inlet port, into a liquid phase and a gas flow, and an outlet port through which the gas flow is discharged, wherein:

a partition wall configured to form the gas-liquid separation chamber is provided in the casing;

the inlet port is disposed on a surface of the partition wall in the gas-liquid separation chamber; and the gas-liquid separator further includes a deflection member configured to change a flow direction of the gas-liquid two-phase flow that flows in from the inlet port, and a clearance is formed between the deflection member and an inner wall of the casing.

In such a configuration, due to the gas-liquid two-phase flow flowing out from the inlet port, a Venturi effect is developed in the minute gap (clearance) formed between the deflection member and the inner wall of the casing. Stated otherwise, a flow directed toward the gas-liquid separation chamber occurs through the clearance. At the time that a drain liquid (stored liquid) exists inside a separate chamber partitioned by the partition wall from the gas-liquid separation chamber, the drain liquid is sucked in by this flow and moves into the gas-liquid separation chamber. On the other hand, the drain liquid inside the gas-liquid separation chamber moves into the separate chamber. By the drain liquid which moves in this manner, the liquid surface level of the drain liquid becomes inclined so as to avoid the inlet port.

As a result, a situation in which the inlet port is occluded or closed by the stored liquid is avoided. Therefore, even in the case that the gas-liquid separator is in an inclined posture, inward flowing of the gas-liquid two-phase flow into the casing from the inlet port occurs easily. Accordingly, for example, in the case that the gas-liquid separator is incorporated in a fuel cell system, separation of the gas and liquid from the fuel cell can be continuously performed with respect to the discharged hydrogen, and therefore, steady operation of the fuel cell can be continued.

Further, for example, in the case of discharged hydrogen from a fuel cell or the like, when hydrogen having a small specific gravity and water having a large specific gravity are separated, it has originally been desirable to dispose the inlet port at a position higher than the drain port in order to promote gas-liquid separation. However, for convenience and in order to facilitate equipment layout, in certain cases, it is inevitable that the inlet port must be disposed in a bottom portion of the casing. According to the present invention, even in such a case, on the basis of the above-described Venturi effect, the inlet port is prevented from becoming blocked by the stored liquid.

A guide member may preferably be disposed inside the gas-liquid separation chamber and guide the gas-liquid two-phase flow that flows from the deflection member. In this case, the flow direction of the gas-liquid two-phase flow is changed by the guide member. More specifically, while being guided by the guide member, the gas-liquid two-phase flow remains within the gas-liquid separation chamber for a comparatively long time period. Concurrently with the above, the gas-liquid two-phase flow is sufficiently separated into a liquid phase and a gas phase (gas flow). Stated otherwise, adequate gas-liquid separation efficiency can be obtained.

In the case that the inlet port is disposed on a bottom portion of the casing, then after the gas-liquid two-phase flow introduced from the inlet port has risen, the gas-liquid two-phase flow may be lowered by the guide member. Owing to this feature, as described above, the gas-liquid two-phase flow remains within the gas-liquid separation chamber for a comparatively long time period.

The inlet port and the outlet port may preferably be provided on the same end surface of the casing. This is because, in this case, the process of forming the inlet port and the outlet port for obtaining the casing becomes easy to perform.

The gas-liquid separator, which is configured as described above, can be adopted, for example, as a constituent device of a fuel cell system including a fuel cell. In this case, the fuel exhaust gas discharged from an anode of the fuel cell is supplied as the gas-liquid two-phase flow to the gas-liquid separator.

According to the present invention, the partition wall for forming the gas-liquid separation chamber is provided in the casing that makes up the gas-liquid separator, together with the inlet port for supplying a gas-liquid two-phase flow to the gas-liquid separator being opened on the surface of the partition wall in the gas-liquid separation chamber, and furthermore, the deflection member is provided that covers the opening of the inlet port. Therefore, when the gas-liquid two-phase flow flows from the inlet port into the gas-liquid separation chamber, a Venturi effect is developed in the minute gap (clearance) formed between the deflection member and the inner wall of the casing.

Due to the Venturi effect, a flow directed toward the gas-liquid separation chamber occurs through the clearance. At the time that a drain liquid exists inside a separate chamber partitioned by the partition wall from the gas-liquid separation chamber, the drain liquid is sucked in by this flow and moves into the gas-liquid separation chamber. On the other hand, the drain liquid inside the gas-liquid separation chamber moves into the separate chamber. Due to the movement of the drain liquid occurring in this manner, the liquid surface level of the drain liquid becomes inclined so as to avoid the inlet port.

As a result, a situation in which the inlet port is occluded or closed by the stored liquid is avoided. Therefore, for example, even in the case that the gas-liquid separator is in an inclined posture, inward flowing of the gas-liquid two-phase flow into the casing from an inlet port occurs easily. Accordingly, for example, even in the case that the gas-liquid separator is incorporated in an in-vehicle type fuel cell system, it is possible to continue the gas-liquid separation for the hydrogen discharged from the fuel cell. Stated otherwise, steady operation of the fuel cell can be continued.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a schematic vertical cross-sectional view of the gas-liquid separator of FIG. 2.

DESCRIPTION OF THE PREFERRED EMBODIMENTS

A preferred embodiment of a gas-liquid separator according to the present invention will be described in detail below with reference to the accompanying drawings. In the present embodiment, a case is exemplified in which the gas-liquid separator is attached to a fuel cell to thereby constitute a fuel cell system. Further, in the following description, up, down, left, and right orientations of the gas-liquid separator correspond to the up, down, left, and right directions shown in FIG. 2, but this is simply for the sake of convenience and to facilitate understanding. In particular, the illustrated left and right directions do not necessarily specify the left and right directions when the gas-liquid separator is actually used.

Figure 1:
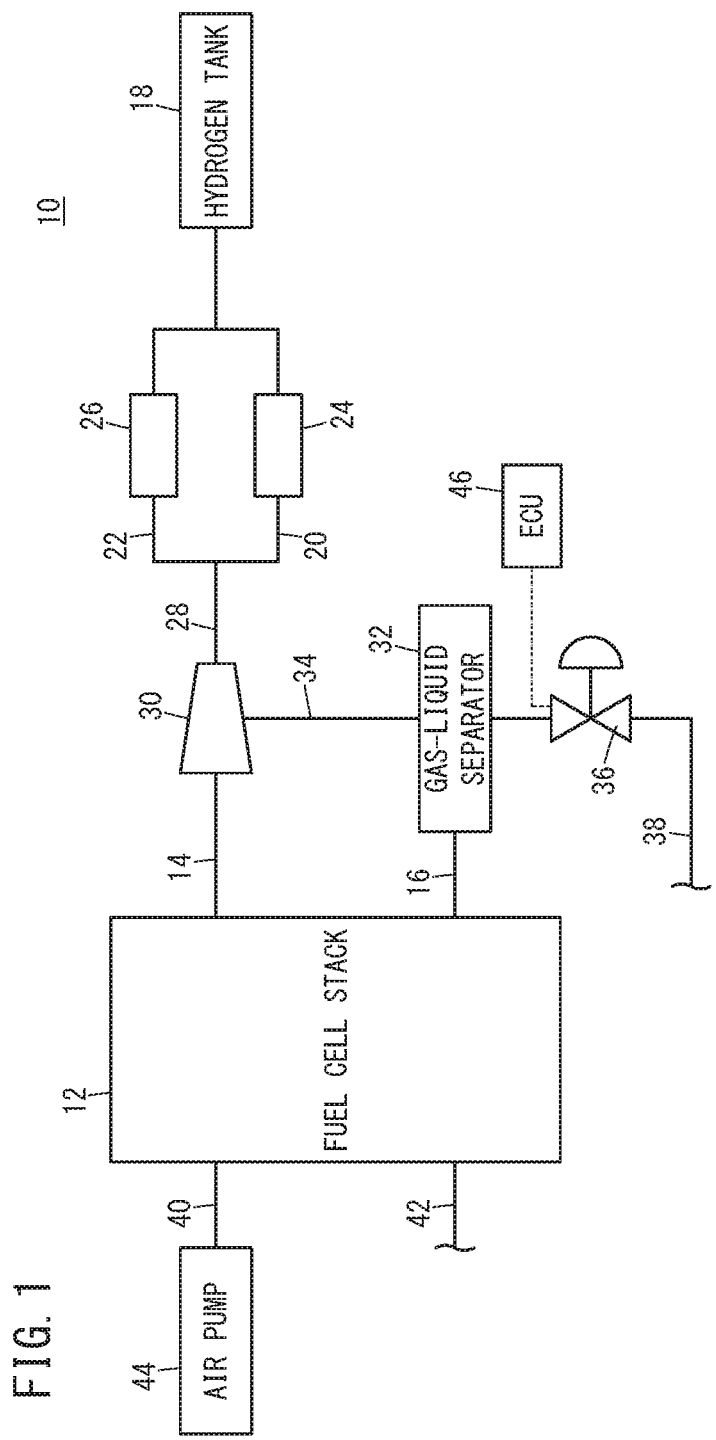
FIG. 1 is a schematic configuration diagram of principal components of a fuel cell system including a gas-liquid separator according to an embodiment of the present invention.

Initially, the fuel cell system will be described briefly with reference to FIG. 1. A fuel cell system 10 is an in-vehicle type of fuel cell system which is installed in a fuel cell vehicle (not shown) such as a fuel cell electric vehicle or the like.

The fuel cell system 10 includes a fuel cell stack 12 which is constituted by stacking a plurality of non-illustrated fuel cells. Each of the individual fuels cells is configured, for example, by sandwiching between a pair of separators an electrolyte electrode assembly (e.g., membrane electrode assembly) having an electrolyte made up from a solid polymer membrane, and an anode and a cathode, which face toward each other with the electrolyte interposed therebetween. It should be noted that such a configuration is well known, and therefore, illustration and a detailed description thereof are omitted.

The fuel cell system 10 further includes a hydrogen supply flow passage 14 (fuel gas supply flow passage) attached to the fuel cell stack 12 for supplying a fuel gas to the anode, and a hydrogen discharge flow passage 16 (fuel exhaust gas discharge flow passage) for discharging the fuel exhaust gas from the anode. Among these passages, a hydrogen tank 18 in which high-pressure hydrogen is stored as the fuel gas is connected to the hydrogen supply flow passage 14.

The hydrogen supply flow passage 14 branches into two branch paths, and therefore, the hydrogen supply flow passage 14 includes a first branch path 20 and a second branch path 22. A first injector 24 and a second injector 26 are disposed respectively in the first branch path 20 and the second branch path 22. The first branch path 20 and the second branch path 22 merge together on a downstream side of the first injector 24 and the second injector 26 to thereby form a merged passage 28, and an ejector 30 is disposed in the merged passage 28.

A gas-liquid separator 32 is connected to the other hydrogen discharge flow passage 16. A circulation flow passage 34 that departs from the gas-liquid separator 32 is connected to the ejector 30. Further, a drainage flow passage 38, through which the water is discharged via a drain valve 36, is provided at the bottom of the gas-liquid separator 32.

The fuel cell system 10 further includes an air supply flow passage 40 (oxygen containing gas supply flow passage) for supplying compressed air as an oxygen containing gas to the cathode, and an air discharge flow passage 42 (oxygen containing gas discharge flow passage) for discharging exhaust compressed air from the cathode. An air pump 44 (compressor) for compressing and supplying air is provided in the air supply flow passage 40.

A non-illustrated coolant supply flow passage through which a coolant is supplied to the fuel cell stack 12 is further provided in the fuel cell stack 12, and an ECU 46 serving as a control unit is attached thereto for controlling the fuel cell stack 12 as a whole. The fuel cell system 10 is constructed in the manner described above.

Next, the gas-liquid separator 32 according to the present embodiment will be described.

Figure 2:
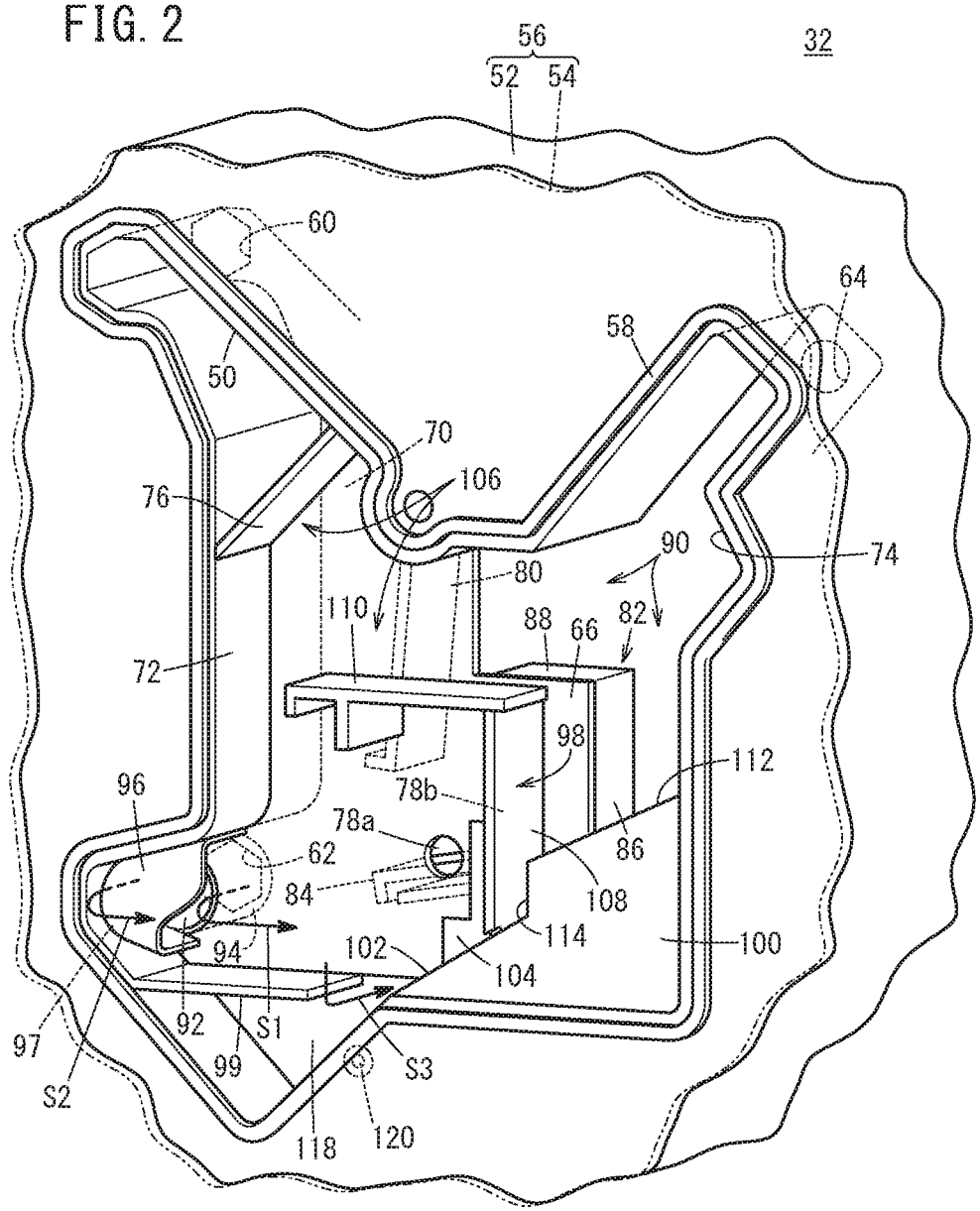
FIG. 2 is a schematic perspective view of principal components of the gas-liquid separator according to the embodiment of the present invention.
Figure 3:
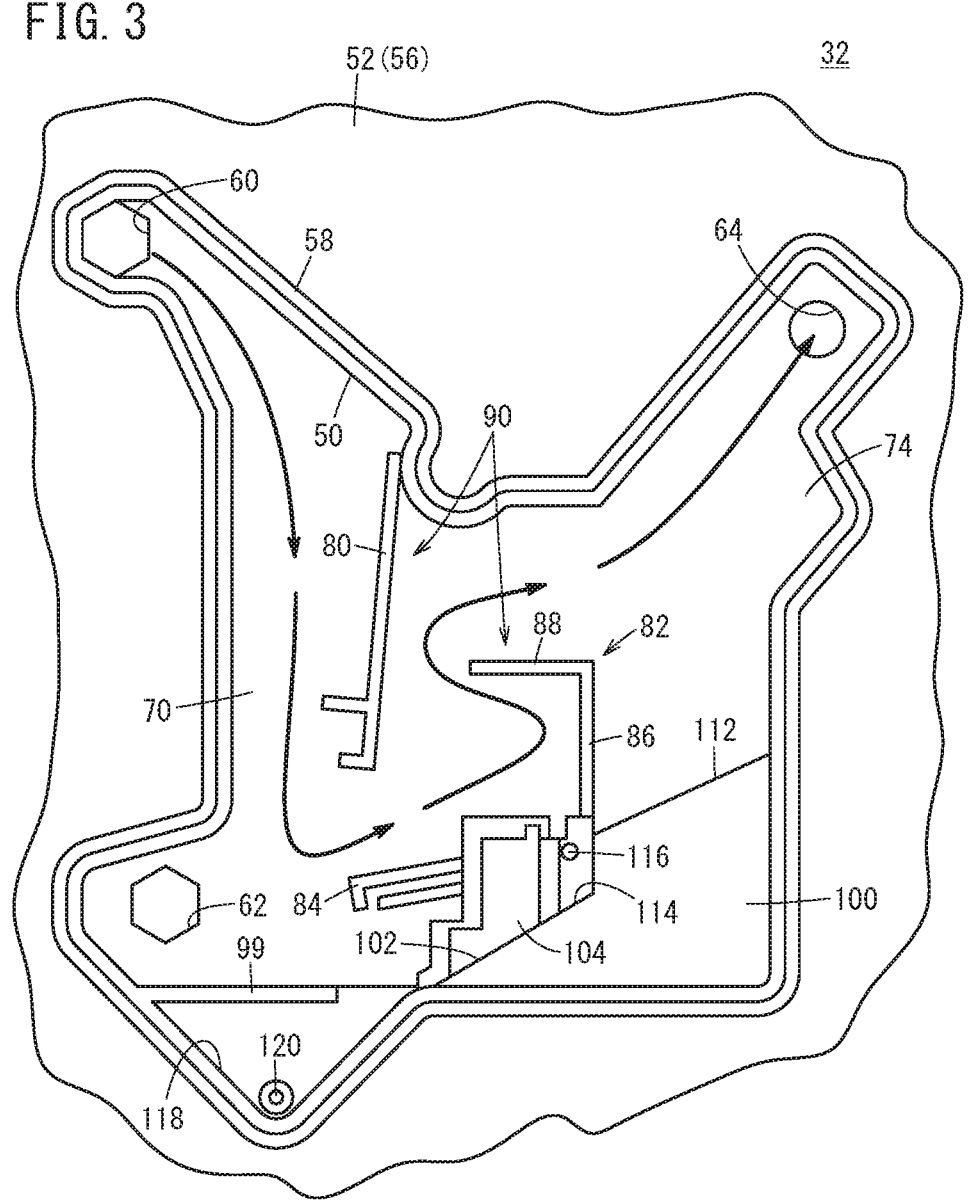
FIG. 3 is a schematic side view with partial omission showing principal components of the gas-liquid separator of FIG. 2.
Figure 4:
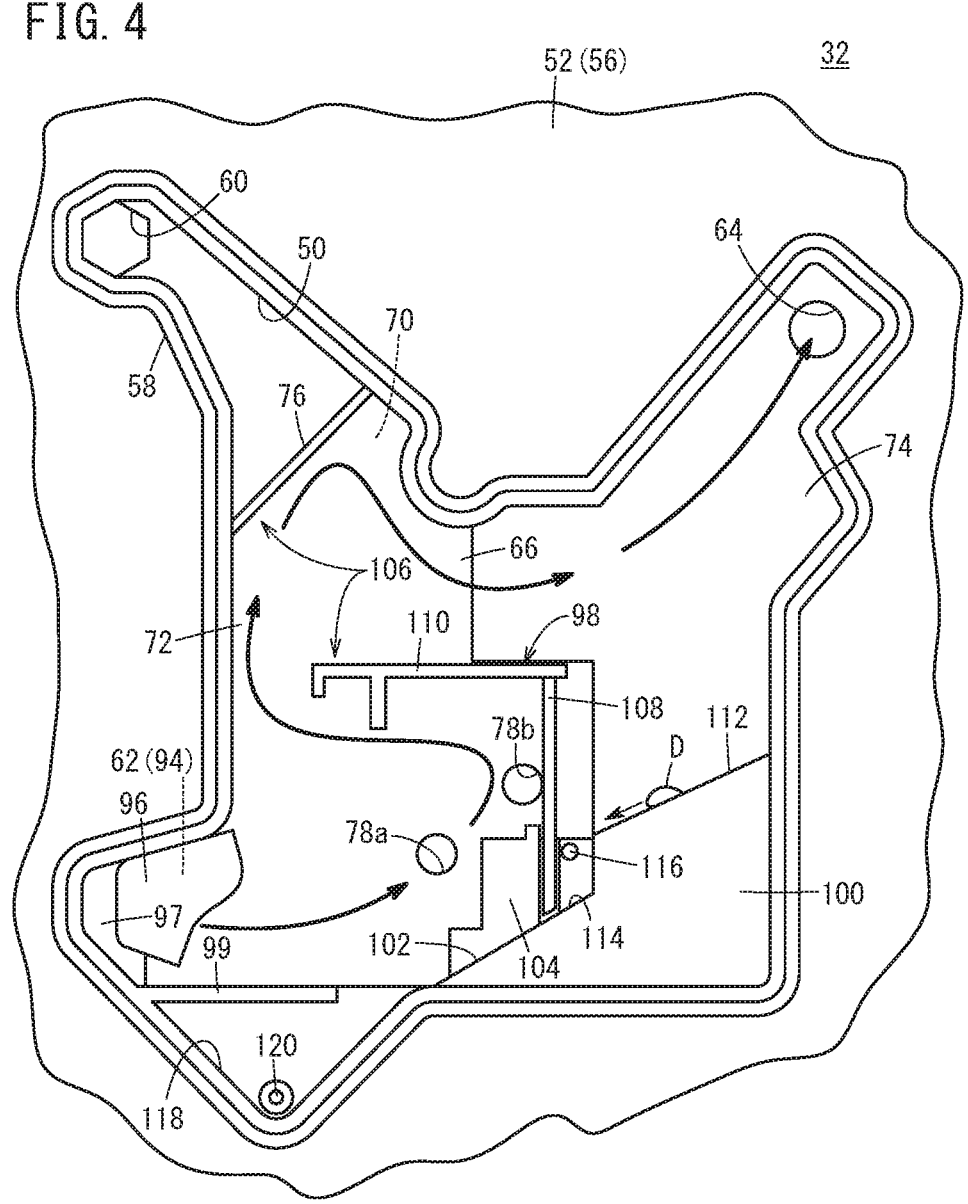
FIG. 4 is a schematic side view of principal components of the gas-liquid separator of FIG. 2.

FIGS. 2 to 4 are a perspective view of principal components, a schematic side view with partial omission showing principal components, and a schematic side view of principal components, respectively, of the gas-liquid separator 32 according to the present embodiment. The gas-liquid separator 32 comprises a casing 56 having a main body member 52 in which there is formed an internal chamber 50 that opens on one end surface, and a closing member 54 attached to the one end surface to thereby close the internal chamber 50. A space formed between the main body member 52 and the closing member 54 is sealed by a sealing material 58.

A first inlet port 60 and a second inlet port 62 which communicate with the internal chamber 50 are formed respectively at upper left and lower left portions on another end surface of the main body member 52. More specifically, the first inlet port 60 is disposed higher (at a higher position) than the second inlet port 62. Further, an outlet port 64 is formed at an upper right portion. Accordingly, the gas-liquid separator 32 has a plurality of (in this case, two) inlet ports 60, 62, and a single outlet port 64.

A partition wall 66 which is made from a plate material is attached to and extends in the internal chamber 50. The interior of the internal chamber 50 is divided by the partition wall 66 into a first gas-liquid separation chamber 70 on the rear side of the drawing sheet, and a second gas-liquid separation chamber 72 on the front side of the drawing sheet in FIG. 2. In FIG. 3, in which the closing member 54, the partition wall 66, and a second guide member 106 (to be described later) are omitted from illustration, the first gas-liquid separation chamber 70 is shown, and in FIG. 4, in which the partition wall 66 is illustrated, the second gas-liquid separation chamber 72 is shown.

Moreover, the area of the partition wall 66 is substantially one half the area of the internal chamber 50, which is determined in a planar view of the internal chamber 50 (see FIG. 4). More specifically, in the internal chamber 50, the partition wall 66 exists only on an upstream side in the flow direction of the discharged hydrogen. A space in the internal chamber 50 in which the partition wall 66 does not exist is located more on the downstream side in the flow direction than the first gas-liquid separation chamber 70 and the second gas-liquid separation chamber 72, and the space serves as a collection chamber 74 in which the discharged hydrogen having passed through the first gas-liquid separation chamber 70, and the discharged hydrogen having passed through the second gas-liquid separation chamber 72 merge (are collected) together and become a merged flow.

A dam plate 76 is provided on an upper left side of the end surface on the front side of the partition wall 66 with respect to the drawing sheet. The dam plate 76 serves to prevent the discharged hydrogen, which is introduced into the casing 56 from the first inlet port 60, from flowing into the second gas-liquid separation chamber 72, and together therewith, carries out a role of changing the flow direction of the discharged hydrogen.

Further, two breathing holes 78a, 78b are formed in the partition wall 66. The first gas-liquid separation chamber 70 and the second gas-liquid separation chamber 72 communicate with each other through the breathing holes 78a, 78b.

As shown in FIGS. 2 and 3, on the other end surface of the main body member 52 on which the first inlet port 60, the second inlet port 62, and the outlet port 64 are formed, a first regulating member 80 and a second regulating member 82 are provided in a manner so as to project into the internal chamber 50. The first regulating member 80 extends toward the lower left in a slightly inclined manner with respect to the vertical direction. On the other hand, the second regulating member 82 includes an inclined guide member 84 which is inclined from the lower left toward the upper right, a first vertical part 86 contiguous with the inclined guide member 84 and extending vertically upward, and a first horizontal part 88 contiguous with the first vertical part 86 and extending horizontally to the left. The first regulating member 80 and the second regulating member 82 constitute a first guide member 90 which is configured to change the flow direction of the discharged hydrogen inside the first gas-liquid separation chamber 70 (specifically, to regulate the flow direction of the discharged hydrogen in a predetermined direction inside the first gas-liquid separation chamber 70).

The partition wall 66 abuts against a side surface portion on the front side of the drawing sheet of the first regulating member 80 and the second regulating member 82. In addition, an arcuate cutout 92 is formed at a lower left portion of the partition wall 66, and together therewith, a conduit 94 (see FIG. 2) bridges across from the second inlet port 62 to the arcuate cutout 92. Therefore, the second inlet port 62 is formed in a shape of being opened via the conduit 94 on a surface of the partition wall 66 in (facing toward) the second gas-liquid separation chamber 72.

In the vicinity of the opening of the conduit 94, or stated otherwise, in the vicinity of the opening of the second inlet port 62, a deflection member 96 is arranged in covering relation to the opening at a position spaced apart from the opening by a predetermined distance. The deflection member 96 serves to change the flow direction of the discharged hydrogen that flows in from the conduit 94 (the second inlet port 62), and opens in facing relation to a third regulating member 98 provided on the right side thereof.

In FIGS. 2 and 4, on a left side of the deflection member 96, and more specifically, on the closed rear side thereof, a communicating section 97 is provided which enables communication between the first gas-liquid separation chamber 70 and the second gas-liquid separation chamber 72 (in particular, refer to FIG. 4). The communicating section 97 is formed from the inner wall of the casing 56 to the rear part of the deflection member 96. More specifically, by the communicating section 97, a minute space (part of clearance) is formed between the deflection member 96 and the inner wall of the casing 56. The clearance formed by the communicating section 97, for example, is on the order of from 3 to 5 mm. Further, a plate-shaped blocking member 99 is provided on an upper part of a later-described reservoir 118.

The third regulating member 98 is formed integrally with a gripping member 104 that grips a right lower end of the partition wall 66 on an inclined surface 102 of a support base 100. The third regulating member 98 constitutes the second guide member 106 together with the dam plate 76, and changes the flow direction of the discharged hydrogen in the second gas-liquid separation chamber 72. More specifically, the flow direction of the discharged hydrogen in the second gas-liquid separation chamber 72 is regulated in a predetermined direction.

The third regulating member 98 is disposed at a position that overlaps substantially in a planar view with the second regulating member 82 that makes up the first guide member 90. More specifically, the third regulating member 98 is made up from a second vertical part 108 that overlaps substantially with the first vertical part 86, and a second horizontal part 110 connected to the second vertical part 108 and extending horizontally to the left, and which overlaps substantially with the first horizontal part 88. As can be understood from the description given above, the interior of the first gas-liquid separation chamber 70 and the second gas-liquid separation chamber 72 is of a crank-like shape formed by the first guide member 90 and the second guide member 106, respectively.

The support base 100 includes a guiding inclined portion 112 that serves as a guide path for guiding the water droplets D. Further, a predetermined step is formed between the inclined surface 102 and the guiding inclined portion 112, and a temporary liquid storage section 114 is formed by the step and the third regulating member 98 (second vertical part 108). The water droplets D which are guided by the guiding inclined portion 112 are temporarily stored in the temporary liquid storage section 114. A liquid transfer hole 116 (refer to FIGS. 3 and 4), through which the water stored in the temporary liquid storage section 114 is transferred to the side of the first gas-liquid separation chamber 70, is formed in the gripping member 104.

In the first gas-liquid separation chamber 70 and the second gas-liquid separation chamber 72, a bottom portion thereof is cut out so as to form the reservoir 118 having a predetermined volume. The reservoir 118 communicates with the first gas-liquid separation chamber 70 and the second gas-liquid separation chamber 72.

At the bottom of the reservoir 118, a drain port 120 is provided which serves as a liquid discharge member for discharging the water inside the reservoir 118. The drain valve 36 is connected to the drain port 120, and discharges the water in the reservoir 118 when the drain valve 36 is in an open state. On the other hand, the water is stored in the reservoir 118 when the drain valve 36 is in a closed state.

The gas-liquid separator 32 according to the present embodiment is basically configured in the manner described above. Next, functions and effects thereof will be described.

When the fuel cell stack 12 is operated, hydrogen as a fuel gas is supplied from the hydrogen tank 18 into the hydrogen supply flow passage 14. After having passed through either the first injector 24 of the first branch path 20 or the second injector 26 of the second branch path 22, the hydrogen further passes through the ejector 30 of the merged passage 28, and is supplied to the anode of the respective fuel cells that constitute the fuel cell stack 12.

On the other hand, compressed air serving as an oxygen containing gas is delivered via the air pump 44 into the air supply flow passage 40. The compressed air is humidified by the later-described exhaust compressed air, and then is supplied to the cathodes of the respective fuel cells that constitute the fuel cell stack 12.

By the reaction gases which are supplied as described above, electrode reactions are made to take place respectively at the anodes and the cathodes of the respective fuel cells. Consequently, electrical power is generated. Moreover, a cooling medium flow passage is formed in the fuel cell stack 12, and a cooling medium, which is supplied through a cooling medium supply flow passage, flows through the cooling medium flow passage.

The compressed air supplied to the cathodes and which is partially consumed is discharged as exhaust compressed air in the air discharge flow passage 42. The exhaust compressed air is a moist or humidified gas containing moisture generated by the electrode reaction at the cathodes. In a non-illustrated humidifier, this exhaust compressed air humidifies the oxygen containing gas that is newly supplied to the cathodes. Thereafter, the exhaust compressed air is set to a predetermined pressure and is discharged to the exterior of the fuel cell system 10.

On the other hand, the hydrogen supplied to the anodes and which is partially consumed is discharged as discharged hydrogen in the hydrogen discharge flow passage 16. During the process of flowing through the hydrogen discharge flow passage 16, the discharged hydrogen is supplied to the gas-liquid separator 32.

At this time, the discharged hydrogen is introduced separately into the casing 56 from the first inlet port 60 and the second inlet port 62 shown in FIG. 2. The discharged hydrogen that flows inwardly from the upper first inlet port 60 advances slightly in an inclined manner in a right downward direction along the inner wall of the internal chamber 50, and due to the presence of the partition wall 66, flows into the first gas-liquid separation chamber 70 that is formed on the rear side of the drawing sheet in FIG. 2. Moreover, the discharged hydrogen that attempts to advance into the second gas-liquid separation chamber 72 is blocked by the dam plate 76 provided on the end surface on the front side of the partition wall 66 with respect to the drawing sheet. Therefore, the discharged hydrogen that flows in from the first inlet port 60 is prevented from flowing into the second gas-liquid separation chamber 72.

The discharged hydrogen flowing into the first gas-liquid separation chamber 70 flows along the direction in which the first regulating member 80 extends. For this reason, the flow direction of the discharged hydrogen is changed from a right downward direction up to that point, and goes slightly leftward, rather than straight vertically downward.

Thereafter, the discharged hydrogen proceeds along the inclined guide member 84, and then the first vertical part 86 and the first horizontal part 88 of the second regulating member 82. Therefore, the flow direction of the discharged hydrogen changes sequentially from the lower left to the upper right, and from the upper right to a horizontal (leftward) direction. Furthermore, the discharged hydrogen rises by being guided by the end face of the first regulating member 80 that faces toward the second regulating member 82, and then the flow direction thereof is deflected toward the side of the collection chamber 74. As a result, the discharged hydrogen is led out from the first gas-liquid separation chamber 70 and arrives at the collection chamber 74. In FIG. 3, the above-described flow-through process is indicated by the arrows.

By such a flow-through process, the flow rate of the discharged hydrogen rapidly decreases. Furthermore, the first guide member 90 (the first regulating member 80, the second regulating member 82) is formed inside the first gas-liquid separation chamber 70, and the interior of the first gas-liquid separation chamber 70 is of a crank-like shape. Therefore, the discharged hydrogen remains within the first gas-liquid separation chamber 70 for a comparatively long time period. For the reasons described above, the discharged hydrogen (liquid-gas two-phase flow) supplied from the first inlet port 60 into the first gas-liquid separation chamber 70 is efficiently separated into a water portion, which is a liquid phase, and a first hydrogen gas flow (first gas flow), which is a vapor phase. The water portion is stored in the reservoir 118, and the first hydrogen gas flow flows into the collection chamber 74.

On the other hand, the discharged hydrogen that has flowed in a roundabout manner to the side of the lower second inlet port 62 passes via the conduit 94 disposed inside the first gas-liquid separation chamber 70, and is led out from the opening in the interior of the second gas-liquid separation chamber 72. Therefore, the discharged hydrogen that flows in from the second inlet port 62 is prevented from flowing into the first gas-liquid separation chamber 70.

In the vicinity of the opening, as described above, the deflection member 96 is provided which opens in a rightward direction. Therefore, the flow direction of the discharged hydrogen that is led out from the conduit 94 changes from the side of the closing member 54 to the side of the third regulating member 98 on the right. Thereafter, the discharged hydrogen proceeds along the second vertical part 108 and the second horizontal part 110 of the third regulating member 98. Therefore, the flow direction of the discharged hydrogen changes briefly from the lower left toward the upper right, and then from the upper right in a horizontal (leftward) direction. Furthermore, the discharged hydrogen rises while being guided by the inner wall of the internal chamber 50, and is further guided by the end surface of the dam plate 76 that faces toward the second gas-liquid separation chamber 72, whereupon the flow direction is deflected in a downward direction. As a result, the discharged hydrogen is led out from the second gas-liquid separation chamber 72 and arrives at the collection chamber 74. In FIG. 4, the above-described flow-through process is indicated by the arrows.

In a similar manner, in the second gas-liquid separation chamber 72 as well, by the aforementioned flow-through process, the flow rate of the discharged hydrogen rapidly decreases. Furthermore, the second guide member 106 (the third regulating member 98, the dam plate 76) is formed inside the second gas-liquid separation chamber 72, and therefore, the interior of the second gas-liquid separation chamber 72 is of a crank-like shape. Therefore, the discharged hydrogen remains within the second gas-liquid separation chamber 72 for a comparatively long time period. Accordingly, the discharged hydrogen (liquid-gas two-phase flow) supplied from the second inlet port 62 (conduit 94) into the second gas-liquid separation chamber 72 is efficiently separated into a water portion, which is a liquid phase, and a second hydrogen gas flow (second gas flow), which is a vapor phase. The water portion is stored in the reservoir 118 in the same manner as the water portion that was separated in the first gas-liquid separation chamber 70, and the second hydrogen gas flow flows into the collection chamber 74.

Furthermore, the first gas-liquid separation chamber 70 and the second gas-liquid separation chamber 72 communicate with each other through the breathing holes 78a, 78b that are formed in the partition wall 66. Therefore, as the aforementioned gas-liquid separation process progresses, the flow rate and the fluid pressure of the discharged hydrogen inside the first gas-liquid separation chamber 70, and the flow rate and the fluid pressure of the discharged hydrogen inside the second gas-liquid separation chamber 72 become substantially equivalent. As a result, the gas-liquid separation efficiencies in the first gas-liquid separation chamber 70 and the second gas-liquid separation chamber 72 also become substantially equivalent. Accordingly, for example, there is no need to increase the withstand pressure of one of the gas-liquid separation chambers so as to be greater than that of the other gas-liquid separation chamber.

The first hydrogen gas flow that is led out from the first gas-liquid separation chamber 70, and the second hydrogen gas flow that is led out from the second gas-liquid separation chamber 72 are collected together in the collection chamber 74 and become a merged flow. More specifically, the flow directions of the first hydrogen gas flow and the second hydrogen gas flow are substantially parallel with each other. Such a merged flow flows into the circulation flow passage 34 (see FIG. 1) via the outlet port 64. Thereafter, the merged flow is drawn in from the circulation flow passage 34 into the ejector 30, and is resupplied together with newly supplied hydrogen to the anodes.

The merged flow (the first hydrogen gas flow and the second hydrogen gas flow) still contains a small amount of moisture. Therefore, accompanying the merged flow coming into contact with the inner walls of the collection chamber 74, the moisture is liquefied and becomes water droplets D (liquid phase) which adhere to the inner walls of the collection chamber 74.

The water droplets D flow downward under the action of gravity, and more specifically, flow downward toward the bottom of the collection chamber 74. In this instance, the guiding inclined portion 112, which is disposed on the support base 100, is positioned at the bottom of the collection chamber 74. The water droplets D are guided by the guiding inclined portion 112, and are temporarily stored in the temporary liquid storage section 114 as a result of being blocked by the second vertical part 108 of the third regulating member 98. Since the temporary liquid storage section 114 is located at a position significantly distanced from the outlet port 64, the water portion that is stored in the temporary liquid storage section 114 is prevented from being drawn into the ejector 30 together with the merged flow.

The liquid transfer hole 116 is formed in the gripping member 104 of the support base 100. Accordingly, when a predetermined amount of water has been stored in the stepped portion, the water overflows from the liquid transfer hole 116. Consequently, the water portion is transferred into the reservoir 118. Hereinafter, the stored water portion will be referred to as "drain water W".

When the deflection member 96 is not provided, the liquid surface of the drain water W in the casing 56, for example, is placed at the position indicated by the imaginary line L1 in FIG. 5 in which the gas-liquid separator 32 is illustrated schematically. In this case, if the fuel cell vehicle in which the fuel cell system 10 is installed becomes inclined accompanying the user performing a steering operation or the like, the gas-liquid separator 32 also assumes such an inclined posture, and therefore, there is a concern that the liquid surface level will block the second inlet port 62. Under this condition, it becomes difficult for the discharged hydrogen to flow from the second inlet port 62 into the first gas-liquid separation chamber 70.

According to the present embodiment, the second inlet port 62 (conduit 94) opens on the surface of the partition wall 66 in the second gas-liquid separation chamber 72, and the opening is covered by the deflection member 96. Therefore, as shown by the arrow S1 in FIG. 2, concerning the discharged hydrogen which flows out from the conduit 94, the flow direction thereof is changed by the deflection member 96 toward the side of the first guide member 90, and the discharged hydrogen proceeds along the inner wall of the closing member 54.

Along therewith, a so-called Venturi effect is developed between the rear part of the deflection member 96 and the casing 56. More specifically, as indicated by the arrow S2 in FIG. 2, via the communicating section 97 (see FIG. 4) which is formed on the rear side of the deflection member 96 and enables communication between the first gas-liquid separation chamber 70 and the second gas-liquid separation chamber 72, a gas flow is generated from the first gas-liquid separation chamber 70 toward the side of the second gas-liquid separation chamber 72. Then, the gas flow which flows into the second gas-liquid separation chamber 72 passes through the narrow clearance between the deflection member 96 and the closing member 54, and thereafter, returns to the first gas-liquid separation chamber 70 through the reservoir 118, as indicated by the arrow S3 in FIG. 2.

As a result of the gas flow moving in the aforementioned manner, the drain water W is pushed out by the gas flow. Then, as indicated by the solid line L2 shown in FIG. 5, the liquid surface level becomes inclined so as to avoid the arcuate cutout 92. More specifically, in the vicinity of the arcuate cutout 92, the liquid surface level is placed more downward (at a lower position) than the arcuate cutout 92. As described above, according to the present embodiment, the arcuate cutout 92 can remain above the drain water W by the Venturi effect that takes place in the vicinity of the clearance including the communicating section 97. Therefore, it becomes possible to continue with the discharge of hydrogen from the arcuate cutout 92 into the first gas-liquid separation chamber 70.

Such a state is maintained even if the fuel cell vehicle in which the fuel cell system 10 is installed becomes inclined accompanying the user performing a steering operation or the like. Stated otherwise, the arcuate cutout 92 is provided above the drain water W. Accordingly, since gas-liquid separation with respect to the discharged hydrogen can continued to be performed in the first gas-liquid separation chamber 70, steady operation of the fuel cell stack 12, and hence the fuel cell system 10 as a whole, can be continued.

Furthermore, according to the present embodiment, the first inlet port 60, the second inlet port 62, and the outlet port 64 are formed on the same end surface of the main body member 52. Therefore, it is easy for processing to be carried out from the material and until the main body member 52 is obtained from the material.

The present invention is not particularly limited to the embodiment described above, and various modifications are possible without departing from the essence and gist of the present invention.

For example, the fuel cell system 10 including the gas-liquid separator 32 is not particularly limited to being a vehicle-mounted type of system, and the fuel cell system 10 may be a stationary type of system.

Further, the gas-liquid separator 32 is not particularly limited to being constituted in the form of a fuel cell system 10, and may be of any type of system insofar as it is used for introducing a gas-liquid two-phase flow from the second inlet port 62 into the interior of the casing 56. The gas-liquid two-phase flow may also be of another type apart from hydrogen in which moisture is contained.

What is claimed is:

1. A gas-liquid separator comprising a casing in which there are formed an inlet port to which a gas-liquid two-phase flow is supplied, two gas-liquid separation chambers configured to separate the gas-liquid two-phase flow, which is introduced from the inlet port, into a liquid phase and a gas flow, and an outlet port through which the gas flow is discharged, wherein:

a partition wall, configured to form the two gas-liquid separation chambers, is provided in the casing;

the inlet port of the casing communicates with an opening, the opening being formed on a surface of the partition wall facing at least one of the two gas-liquid separation chambers;

the gas-liquid separator further comprises a deflection member configured to change a flow direction of the gas-liquid two-phase flow that flows in from the inlet port through the opening, and a clearance is formed between the deflection member and an inner wall of the casing; and the deflection member is configured to change the flow direction of the gas-liquid two-phase flow away from the clearance.

2. The gas-liquid separator according to claim 1, further comprising a guide member disposed inside the two gas-liquid separation chambers, and configured to guide the gas-liquid two-phase flow flowing from the deflection member.

3. The gas-liquid separator according to claim 2, wherein the inlet port and a liquid discharge member are disposed on a bottom portion of the casing, and after the gas-liquid two-phase flow introduced from the inlet port has risen, the gas-liquid two-phase flow is lowered by the guide member.

4. The gas-liquid separator according to claim 1, wherein the inlet port and the outlet port are formed on a same end surface of the casing.

5. The gas-liquid separator according to claim 1, wherein the gas-liquid separator is attached to a fuel cell and constitutes a fuel cell system, wherein a fuel exhaust gas discharged from an anode of the fuel cell is supplied as the gas-liquid two-phase flow.

* * * * *